US006666748B2

(12) United States Patent  
Hiramoto et al.

(10) Patent No.: US 6,666,748 B2
(45) Date of Patent: Dec. 23, 2003

(54) MACHINING CENTER AND METHOD OF CHANGING TOOLS THEREOF

(75) Inventors: Kazuyuki Hiramoto, Minamitsuru-gun (JP); Naoshi Takayama, Minamitsuru-gun (JP); Keigo Tada, Minamitsuru-gun (JP); Takashi Hoshi, Minamitsuru-gun (JP); Naozumi Tanikawa, Minamitsuru-gun (JP); Tsuyoshi Fukuhara, Minamitsuru-gun (JP); Kazutoyo Moriguchi, Minamitsuru-gun (JP)

(73) Assignee: Makino Milling Machine Co., LTD, Tokyo (JP)

( * ) Notice: Subject to any disclaimer, the term of this patent is extended or adjusted under 35 U.S.C. 154(b) by 83 days.

(21) Appl. No.: 09/946,091

(22) Filed: Sep. 4, 2001

(65) Prior Publication Data

US 2002/0028628 A1 Mar. 7, 2002

(30) Foreign Application Priority Data

Sep. 4, 2000 (JP) .......................... 2000-267842

(51) Int. Cl.⁷ ................................. B24B 5/00
(52) U.S. Cl. .............................. 451/5; 451/72; 451/449; 125/11.03
(58) Field of Search ................ 451/5, 56, 57, 451/72, 449, 450; 125/11.03, 11.22

(56) References Cited

U.S. PATENT DOCUMENTS 4,151,684 A * 5/1979 Wada et al. .................. 451/21
4,314,425 A * 2/1982 Bricker et al. ............... 451/450
4,417,422 A   11/1983 Redeker et al.
4,458,660 A    7/1984 Vlk et al.
4,557,078 A * 12/1985 Brill ............................. 451/21
4,571,892 A *  2/1986 Brill ......................... 125/11.23
4,619,078 A   10/1986 Uhlig
4,897,964 A *  2/1990 Vetter ........................... 451/72
6,244,928 B1   6/2001 Hiramoto

FOREIGN PATENT DOCUMENTS

JP          3-35054      5/1991
JP        WO99/59774    11/1999

OTHER PUBLICATIONS

PCT Publication WO99/59774.

* cited by examiner

Primary Examiner—Joseph J. Hail, III
Assistant Examiner—Anthony Ojini
(74) Attorney, Agent, or Firm—Paul & Paul

(57) ABSTRACT

The invention provides a machining center for machining a workpiece by moving a grinding wheel and the workpiece relative to each other in the X, Y and Z directions. The machining center has a main spindle for removably mounting a grinding wheel, a spindle head for rotationally supporting the main spindle, a table for mounting the workpiece, a column for movably supporting the spindle head, and tool dressing means having a dresser spindle, provided over the spindle head to move in the vertical direction toward and away from the grinding wheel mounted to the main spindle, for mounting a dresser for truing or dressing the outer peripheral surface of the grinding wheel.

6 Claims, 14 Drawing Sheets

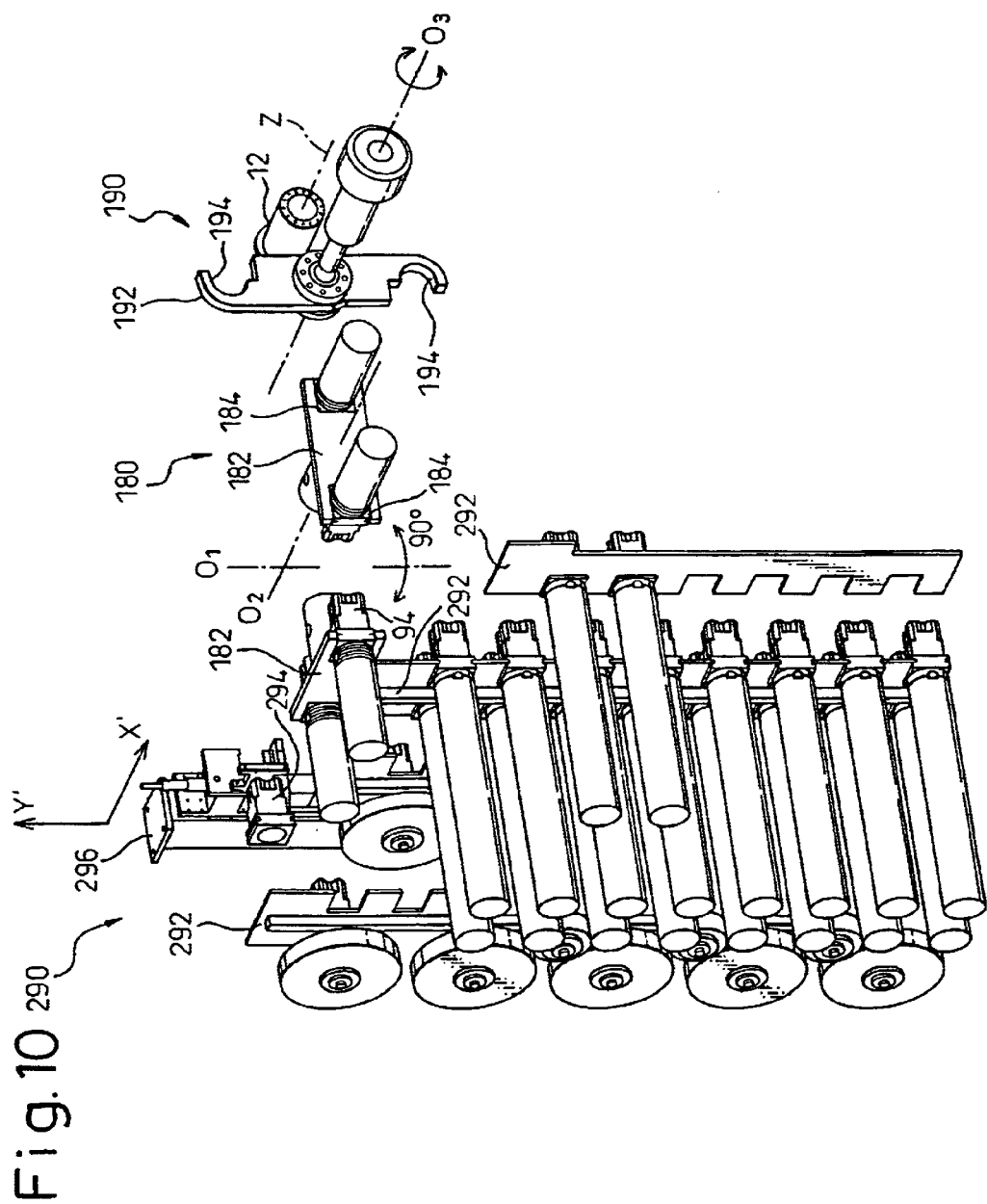

Fig.13
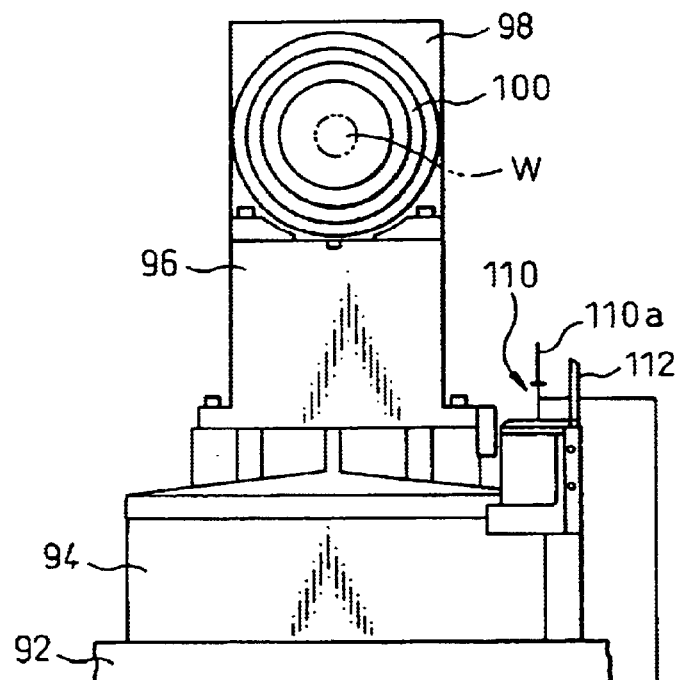
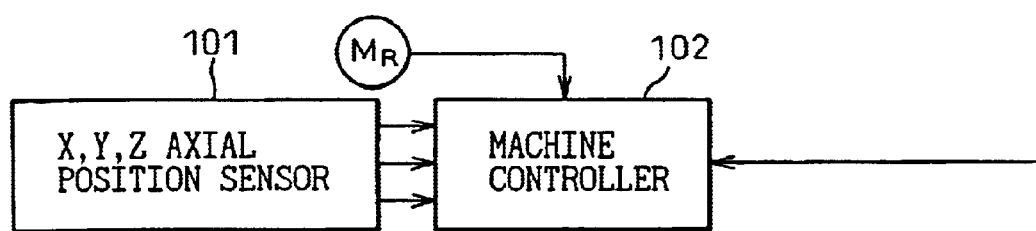

MACHINING CENTER AND METHOD OF CHANGING TOOLS THEREOF

BACKGROUND OF THE INVENTION

1. Field of the Invention

The present invention relates to a machining tool and a method of changing tools thereof. In particular, the present invention relates to a machining center which can true or dress the outer peripheral surface of a grinding wheel concurrently with a grinding process. Further, the present invention relates to a machining center and a method of changing tools thereof, the machining center being improved to effectively remove chips and generated heat, during a process of grinding a workpiece with a grinding wheel, by directing a machining fluid, in the form of a jet, onto a machining area from an optimum position and in an optimum direction. The present invention further relates to a machining center and a method of changing the tools thereof, the machining center being improved to prevent rotation of a cutting tool when the cutting tool is mounted to the machining center.

2. Description of the Related Art

When a metallic workpiece is machined and, in particular, the workpiece is ground, with a tool provided in a machining center, it is essentially necessary to supply a machining fluid to a machining area in order to remove the heat generated in the machining area and to remove chips resulting from machining so as to promote smooth machining by the tool.

As a first prior art, WO99/59774 describes a machine tool with a conventional machining fluid supplying apparatus for supplying a machining fluid to a machining portion of a tool when a workpiece is machined with the tool which is detachably mounted to a spindle of the machine tool. The machining fluid supplying apparatus includes a fluid jet port at the distal end of a fluid supplying nozzle. The fluid supplying nozzle is mounted around a spindle head, which has a spindle, through a support rod and a support bracket so that the nozzle can be moved in both radial and circumferential directions relative to an axis of the spindle by respective moving means. Further, an automatic tool measuring device is mounted to the machine tool so that the diameter of the tool mounted to the spindle is measured to adjust the position of the fluid supplying nozzle of the machining fluid supplying apparatus in both radial and circumferential directions in response to the changes in the tool diameter.

As a second prior art, U.S. Pat. No. 4,619,078 discloses a grinder equipped with a protective hood. The grinder includes a hood for covering a grinding wheel mounted to a spindle. The hood supports a machining fluid supplying nozzle. The machining fluid supplying nozzle can rotate together with the hood in the circumferential directions around the spindle. The machining fluid supplying nozzle also can move in the radial directions about the spindle in accordance with the diameter of the grinding wheel to supply a machining fluid to a contact point between the grinding wheel and a workpiece. The machining fluid supplying nozzle rotates together with the hood to prevent the interference between the hood and the workpiece. A motor moves the nozzle with respect to the hood in accordance with a decrease in the diameter of the grinding wheel, due to wear, so that the supplying direction of the machining fluid can be adjusted.

As a third prior art, Japanese Examined Patent Publication (Kokoku) No. 3-35054 describes a tool changing apparatus of a machine tool. The tool changing apparatus includes tool storing means composed of a plurality of cartridges having a plurality of tool pots (tool sockets) for storing tools. A cartridge having a desired tool is indexed to a tool delivery position. Tool conveying means changes tools disposed at the tool delivery position with tools disposed at the tool exchanging position. Further, the tools are exchanged between the tool exchanging position and the spindle.

The first prior art involves the following problems. Although the machining fluid supplying nozzle can be positioned in both the radial and circumferential directions, the machining fluid supplying nozzle cannot be positioned over the entire periphery around the grinding wheel. Therefore, in the first prior art, the machining fluid supplying nozzle cannot always be positioned at the optimum position, depending on the shape of a workpiece.

The second prior art relates to a machining center which is exclusively dedicated to a grinding process such as a surface grinder, and essentially requires a structure having a protective hood for a grinding wheel. In consequence, when a tool is removably mounted to the spindle by automatic tool changing means as in a machining center, the hood hinders the automatic tool exchange. Furthermore, the hood hinders positioning of the machining fluid supplying nozzle over the entire periphery of the grinding wheel.

In the third prior art, only one tool can be transported at once for the tool exchange. Therefore, this prior art provides low efficiency in the tool exchange when a grinding wheel and a dresser for truing or dressing must be changed in-process, that is, in case that dressing of a tool is conducted during a grinding process.

SUMMARY OF THE INVENTION

The present invention is directed to solve the prior art problems, and to provide a machining center capable of truing or dressing an outer peripheral surface of a grinding wheel during a grinding operation, and a method of changing the tools thereof.

Another object of the present invention is to provide a machining center, and a method of changing the tools thereof, in which a rotating mechanism having no dead angle around a spindle and a linear movement mechanism for linearly moving the machining fluid supplying nozzle in a radial direction cooperate to move the machining fluid nozzle of the machining fluid supplying apparatus to the optimum position for supplying the machining fluid to the engagement area between a tool and a workpiece.

Another object of the present invention is to provide a machining center capable of more efficiently exchanging tools, and a method of changing the tools thereof.

The invention described in claim 1 provides a machining center for machining a workpiece by moving a grinding wheel and the workpiece relative to each other, in the X, Y and Z directions, comprising a main spindle for removably mounting a grinding wheel; a spindle head for rotationally supporting the main spindle; a table for mounting the workpiece; a column for movably supporting the spindle head; and tool dressing means having a dresser spindle, provided over the spindle head, to move in the vertical direction toward and away from the grinding wheel mounted to the main spindle, for mounting a dresser for truing or dressing the outer peripheral surface of the grinding wheel.

According to the invention of claim 1, the dresser spindle can be lifted and lowered relative to the grinding wheel. Therefore, the machining center of the invention can execute a dressing or truing operation for the grinding wheel during a grinding operation, as an in-process operation.

According to another feature of the invention, there is provided a machining center for machining a workpiece by moving a grinding wheel and the workpiece relative to each other in the X, Y and Z directions, comprising a main spindle for removably mounting a grinding wheel; a spindle head for rotationally supporting the main spindle; a table for mounting the workpiece; a column for movably supporting the spindle head; tool dressing means having a dresser spindle, provided over the spindle head, to move in the vertical direction toward and away from the grinding wheel mounted to the main spindle, for mounting a dresser for truing or dressing the outer peripheral surface of the grinding wheel; and machining fluid supplying means including a machining fluid source and a machining fluid nozzle, for directing a machining fluid from the machining fluid source to a dressing area where the grinding wheel and the dresser engage with each other, the machining fluid nozzle being provided for advancing and retreating in an axial direction of the dresser spindle of the tool dressing means.

According to another feature of the invention, there is provided a machining center for machining a workpiece by moving a grinding wheel and the workpiece relative to each other in the X, Y and Z directions, comprising a main spindle for removably mounting a grinding wheel; a spindle head for rotationally supporting the main spindle; a table for mounting the workpiece; a column for movably supporting the spindle head; tool dressing means having a dresser spindle, provided over the spindle head, to move in the vertical direction toward and away from the grinding wheel mounted to the main spindle, for mounting a dresser for truing or dressing the outer peripheral surface of the grinding wheel; machining fluid supplying means including a machining fluid source and a machining fluid nozzle, for directing a machining fluid from the machining fluid source to a dressing area where the grinding wheel and the dresser engage with each other; cylindrical supporting means, disposed around the main spindle, for movably supporting the machining fluid nozzle of the machining fluid supplying means; radially moving means for linearly or rotationally moving the machining fluid nozzle of the machining fluid supplying means which is supported by the cylindrical supporting means to position the machining fluid nozzle in a radial direction relative to the grinding wheel; and circumferentially moving means for rotating the cylindrical supporting means to position the machining fluid nozzle of the machining fluid supplying means at any angular position around the grinding wheel.

According to another feature of the invention, there is provided a machining center for machining a workpiece by moving a grinding wheel and the workpiece relative to each other in the X, Y and Z directions, comprising a main spindle for removably mounting a grinding wheel; a spindle head for rotationally supporting the main spindle; a table for mounting the workpiece; a column for movably supporting the spindle head; tool dressing means having a dresser spindle, provided over the spindle head, to move in the vertical direction toward and away from the grinding wheel mounted to the main spindle, for mounting a dresser for truing or dressing the outer peripheral surface of the grinding wheel; machining fluid supplying means including a machining fluid source and a machining fluid nozzle, for directing a machining fluid from the machining fluid source to a dressing area where the grinding wheel and the dresser engage with each other, the machining fluid nozzle being provided for advancing and retreating in an axial direction of the dresser spindle of the tool dressing means; cylindrical supporting means, disposed around the main spindle, for movably supporting the machining fluid nozzle of the machining fluid supplying means; radially moving means for linearly or rotationally moving the machining fluid nozzle of the machining fluid supplying means which is supported by the cylindrical supporting means to position the machining fluid nozzle in a radial direction relative to the grinding wheel; and circumferentially moving means for rotating the cylindrical supporting means to position the machining fluid nozzle of the machining fluid supplying means at any angular position around the grinding wheel.

According to another feature of the invention, there is provided a machining center for machining a workpiece by moving a grinding wheel and the workpiece relative to each other in the X, Y and Z directions, comprising a main spindle for removably mounting a grinding wheel; a spindle head for rotationally supporting the main spindle; a table for mounting the workpiece; a column for movably supporting the spindle head; machining fluid supplying means including a machining fluid source and a machining fluid nozzle, for directing a machining fluid from the machining fluid source to a dressing area where the grinding wheel and the dresser engage with each other; a nozzle magazine, disposed on the table, for accommodating a plurality of the machining fluid nozzles; and the machining fluid nozzles being changed, between the spindle and the nozzle magazine, by the relative movement of the spindle and the table in the X, Y and Z directions.

According to another feature of the invention, there is provided a machining center for machining a workpiece by moving a grinding wheel and the workpiece relative to each other in the X, Y and Z directions, comprising a main spindle for removably mounting a grinding wheel; a spindle head for rotationally supporting the main spindle; a table for mounting the workpiece; a column for movably supporting the spindle head; tool dressing means having a dresser spindle, provided over the spindle head to move in the vertical direction toward and apart from the grinding wheel mounted to the main spindle, for mounting a dresser for truing or dressing the outer peripheral surface of the grinding wheel; tool accommodating means for storing a plurality of grinding wheels and dressers, the grinding wheels and dressers being mounted through tool pots; tool conveyer means for transporting the grinding wheel and the dresser held, the tool conveyer means having a rotatable tool holding arm for holding the grinding wheel or the dresser together with the tool pot, tool conveyer means rotating by 90 degrees to transport the grinding wheel or the dresser held by the tool holding arm between a tool delivery position and a tool exchanging position in the tool storing means; and tool changing means for exchanging the grinding wheel and the dresser which have been transported by the tool conveyer means to the tool exchanging position with the grinding wheel mounted to the spindle and the dresser mounted to the dresser spindle, respectively.

According to another feature of the invention, there is provided a method of changing tools in a machining center, the machining center including a main spindle for removably mounting a grinding wheel, a spindle head for rotationally supporting the main spindle, a table for mounting the workpiece, a column for movably supporting the spindle head, and tool dressing means having a dresser spindle, provided over the spindle head to move in the vertical direction toward and away from the grinding wheel mounted to the main spindle, for mounting a dresser for truing or dressing the outer peripheral surface of the grinding wheel, the method comprising the steps of: (a) storing a plurality of the grinding wheels and a plurality of the dressers in tool storing means with tool pots; (b) holding grinding wheel and the dresser stored in the tool storing meals together with the tool pot by a tool holding arm of tool conveyer means; (c) rotating by 90 degrees the tool conveyer means to transport the grinding wheel and the dresser held by the tool holding arm from a tool delivery position in the tool storing means to a tool exchanging position; (d) lifting the dresser spindle of the tool dressing means to change, with the tool changing means, the grinding wheel transported to the tool exchanging position with the grinding wheel mounted to the spindle; (e) rotating by 180 degrees the tool holding arm of the tool conveyer means, with the grinding wheel and the dresser, by the tool holding arm holds; (f) lowering the main spindle to change the dresser transported to the tool exchanging position with the dresser mounted to the dresser spindle by the tool changing means; (g) rotating the tool conveyer means by over 90 degrees to transport the used grinding wheel and the used dresser from the tool exchanging position to the tool delivery position; and (h) storing the used grinding wheel and the used dresser conveyed, together with the tool pot, in the tool delivery position in the tool storing means.

According to another feature of the invention, there is provided a machining center for machining a workpiece by moving a grinding wheel and the workpiece relative to each other in the X, Y and Z directions, comprising a main spindle for removably mounting a grinding wheel; a spindle head for rotationally supporting the main spindle; a table for mounting the workpiece; a column for movably supporting the spindle head; tool storing means for storing a plurality of the grinding wheels and the dressers with tool pots fitted to the grinding wheels and the dressers; tool conveyer means for transporting the grinding wheel and the dresser held, the tool conveyer means having a rotatable tool holding arm for holding the grinding wheel or the dresser together with the tool pot, tool conveyer means rotating 90 degrees to transport the grinding wheel or the dresser held by the tool holding arm between a tool delivery position and a tool exchanging position in the tool storing means; and tool changing means for exchanging the grinding wheel and the dresser which have been transported by the tool conveyer means to the tool exchanging position with the grinding wheel mounted to the spindle and the dresser mounted to the dresser spindle, respectively.

DESCRIPTION OF THE DRAWINGS

These and other objects and advantages and a further description will now be discussed in connection with the drawings in which:

FIG. 10 is a perspective view showing a positional relationship among a spindle, tool changing means, tool conveyer means and tool storing means in the machining center according to the present invention;

FIG. 13 is a front view of principal portions when an automatic tool measuring apparatus is mounted to a table of the machining center according to the present invention.

DESCRIPTION OF THE PREFERRED EMBODIMENTS

Figure 1:
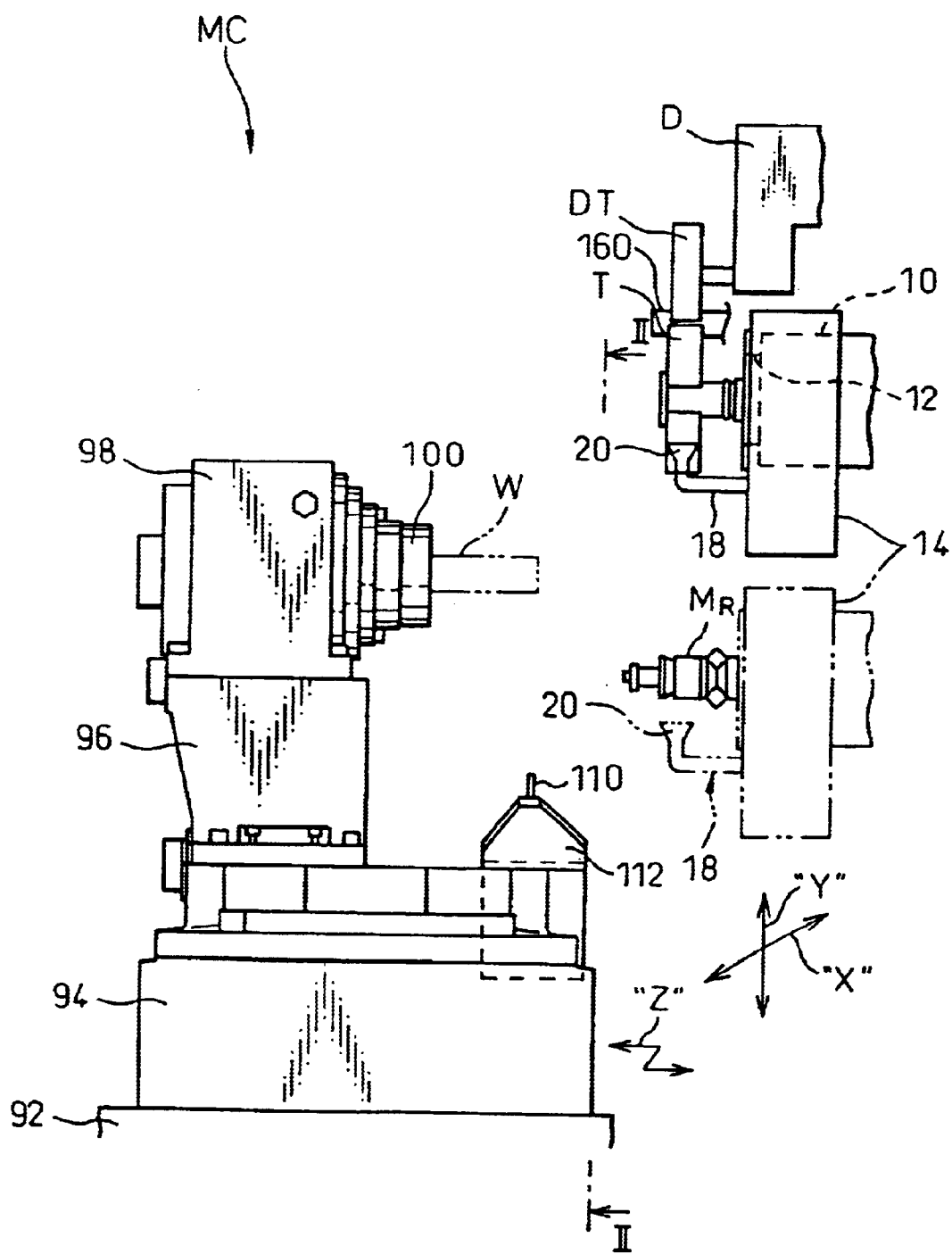
FIG. 1 is a schematic side view showing a machining center according to an embodiment of the present invention.

Preferred embodiments of the present invention will be described hereinafter with reference to the accompanying drawings.

With reference to FIGS. 1 to 6, there is shown a machining center MC according to an embodiment of the present invention. The machining center MC has a main spindle head 10. In the main spindle head 10, a main spindle 12 is provided for rotation at high seed. A grinding wheel T is mounted to a tool fitting portion 12a of the main spindle 12. The main spindle head 10 is mounted to a column 14. The main spindle head 10 can move relatively to the column 14, and relatively to a base (not shown) together with the column 14, in orthogonal two axial directions (X and Y directions). The movements of the main spindle head 10 and of main spindle 12 held by the main spindle head 10, in two directions, are detected by a position detector (not shown) such as a scale provided for each axis in the machining center. In this specification, the vertical direction is defined as the Y-axis, the direction of the center axis of the main spindle 12 perpendicular to the Y-axis, as the Z-axis, and the direction perpendicular to both the Y-axis and the Z-axis, as the X-axis. A machine controller 102 (see FIG. 13) is connected to the machining center MC. The machine controller 102 generates commands to execute the operational control of all the movable parts of the machine including positioning and orientation of a machining fluid supplying apparatus 18.

Figure 2:
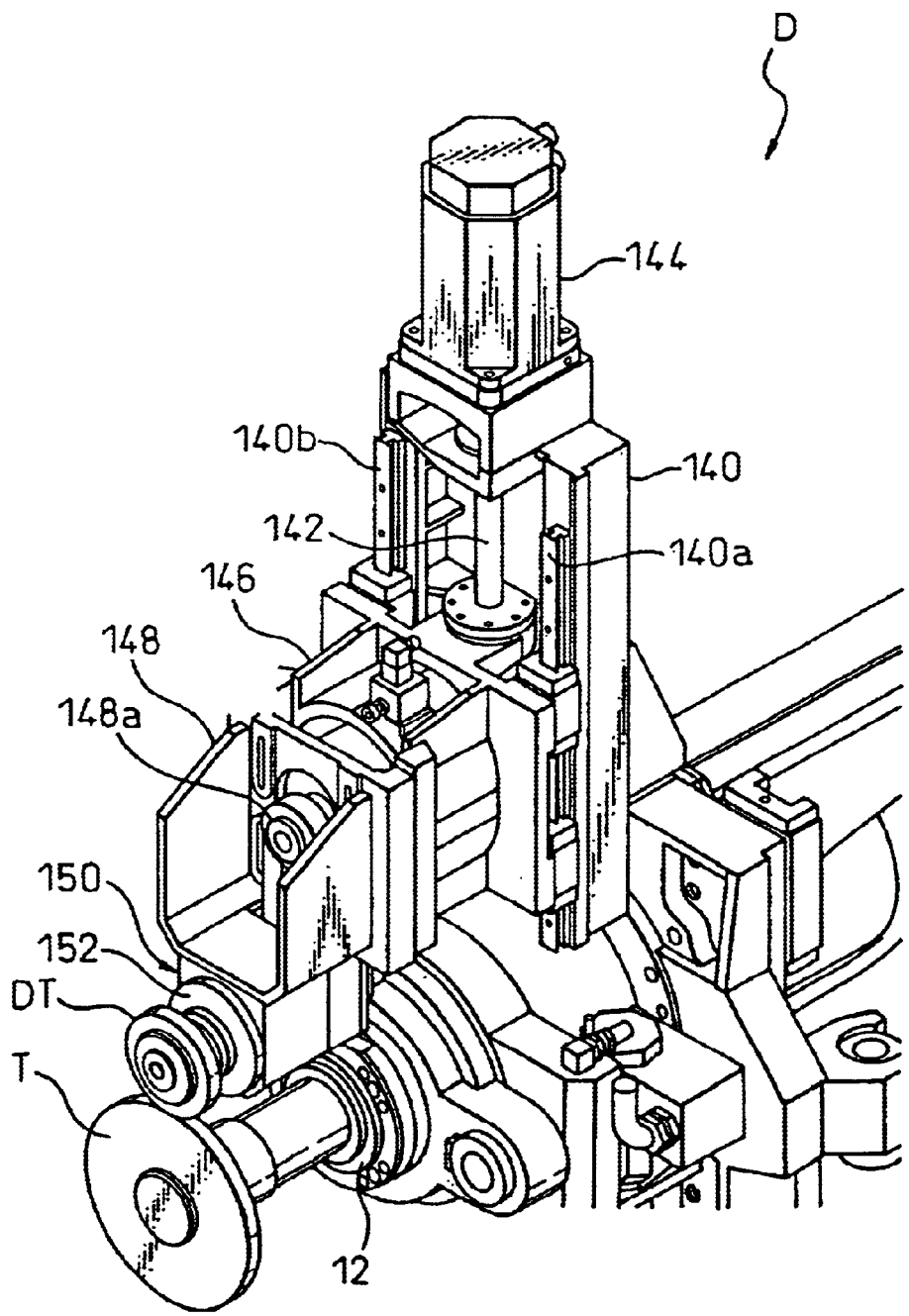
FIG. 2 is a perspective view showing principal portions of a driving mechanism of tool dressing means of the machining center according to the present invention.

The machining center MC includes a tool dressing apparatus D which can true and dress the grinding wheel T mounted to the main spindle 12 in the tool fitting portion 12a during the grinding operation. A dresser tool DT is mounted to the foremost portion of this tool dressing apparatus D. With reference to FIG. 2, the tool dressing apparatus D is equipped with a dresser base 140 which is connected to the main spindle head 10 and can move in both the X and Y directions together with the main spindle head 10. A pair of guides 140a and 140b extend parallel to each other in the Y direction from the front face of the dresser base 140. A slider base 146 is mounted to be slidable along the guides 140a and 140b. The slider base 146 has a nut (not shown) engaging a ball screw 142 which extends in the Y direction inside the dresser base 140. The slider base 146 is driven in the Y direction by a servomotor 144 connected to the upper end of the ball screw 142.

A pulley bracket 148 is mounted to the front face of the slider base 146. A dresser spindle head 150, for rotationally supporting a dresser spindle 152 extending parallel to the main spindle 12, is mounted to the lower surface of the pulley bracket 148. The dresser spindle 152 is rotationally driven by a dresser spindle motor 151 disposed inside the slider base 148 through a power transmission 148a comprising pulleys and a belt.

The dresser tool DT is provided to move together with the dresser spindle head 150 relatively to the spindle 10 in Y-direction along the guides 140a and 140b. Therefore, when the grinding wheel T becomes small as it grinds the workpiece W and as it is dressed by the dresser tool DT, in other words, when the diameter of the grinding wheel T decreases, moving the dresser spindle head 150 toward the grinding wheel T along the guides 140a and 140b insures that the dresser tool DT contacts the outer peripheral surface of the grinding wheel T with an optimum force.

A table 94, movable in the Z-direction, is mounted onto the base 92. A rotary head 98 is mounted to the table 94 through a rotary head base 96. A workpiece W, as an object to be processed, is mounted in an indexable workpiece holder 100 disposed at a center portion of the rotary head 98. In this connection, the workpiece holder 100 is indexed and rotationally driven by a driving motor (not shown), comprising a servomotor, accommodated in the rotary head 98.

Figure 3:
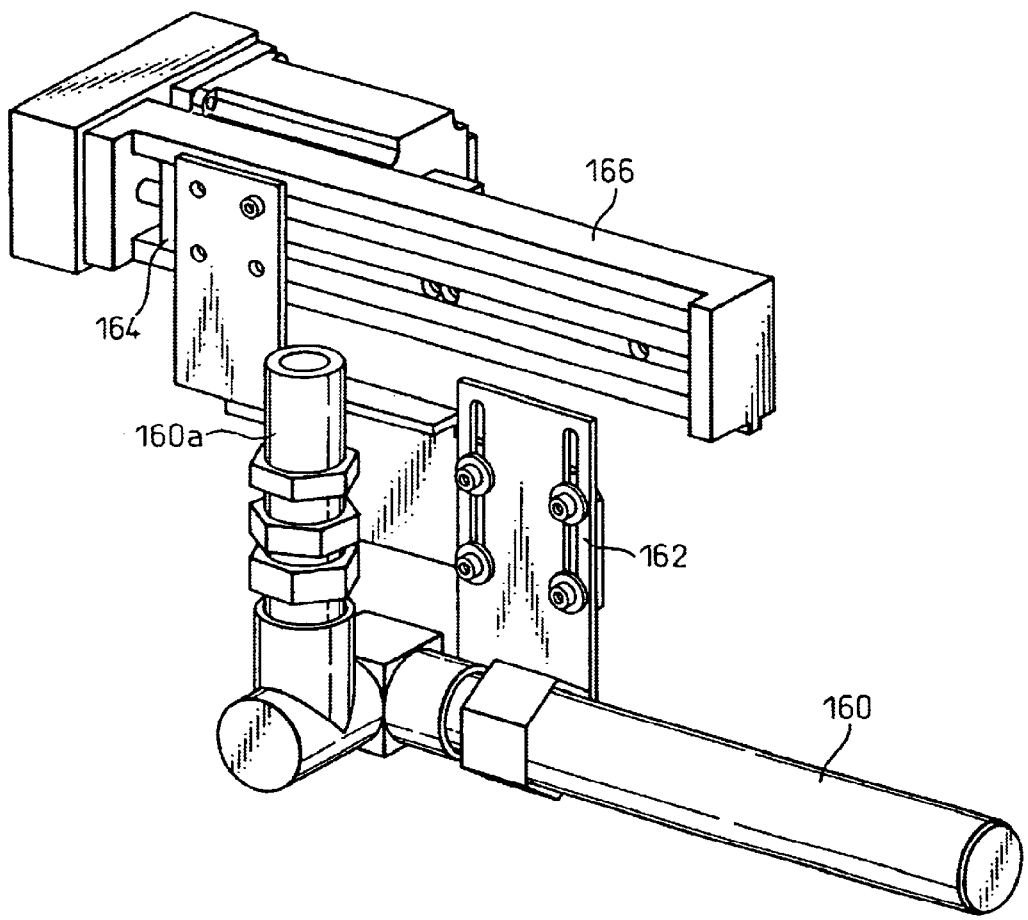
FIG. 3 is a perspective view showing principal portions of a driving mechanism of a dresser nozzle of the machining center according to the present invention.
Figure 4:
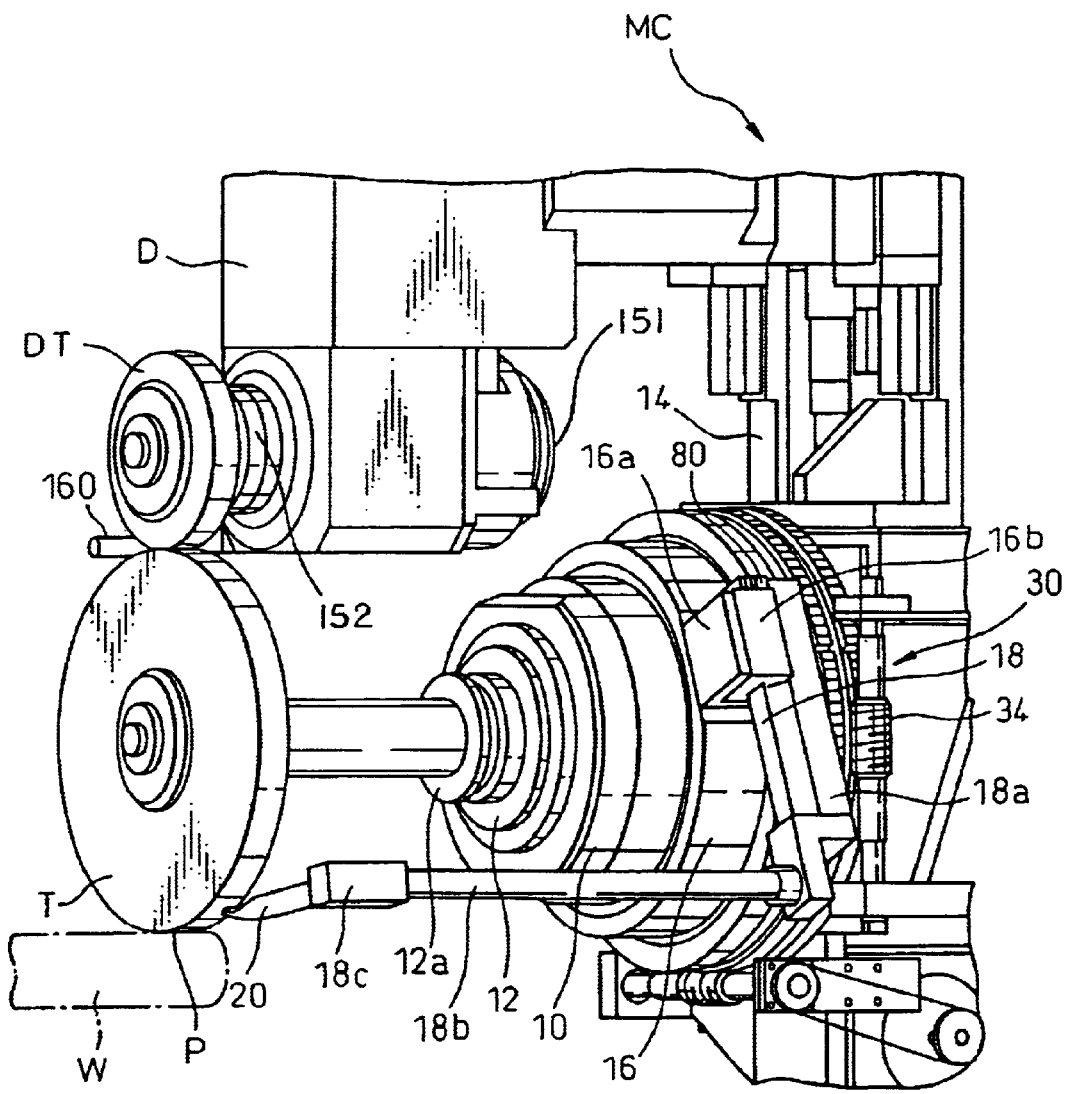
FIG. 4 is a perspective view showing a positional relationship among a spindle, a dresser spindle, a dresser nozzle and a machining fluid supplying nozzle of the machining center according to the present invention.

The machining center MC further includes a dresser nozzle 160 for directing a machining fluid toward the dresser tool DT or toward the contact point between the dresser tool DT and the grinding wheel T. With reference to FIG. 3, the dresser nozzle 160 is mounted on a dresser nozzle slider 164 by a dresser nozzle bracket 162. The dresser nozzle 164 is slidable along a nozzle guide 166 extending in Z-direction. The dresser nozzle guide 166 is mounted to the outer surface of the dresser spindle head 150 to move in the Y-direction together with the dresser spindle head 150. The dresser guide 166 may be mounted to a pulley bracket 148. The rear end of the dresser nozzle 160 is connected to a machining fluid source (not shown) comprising a pump, a tank, etc, through an inlet 160a.

The machining center MC further includes a cylindrical support 16 rotationally mounted to the main spindle head 10 through a bearing, as described hereinafter. The cylindrical support 16 supports the machining fluid supplying apparatus 18. When the cylindrical support 16 rotates, the machining fluid supplying apparatus 18 rotates about the center axis of the main spindle head 10, i.e., the rotational axis of the main spindle 12. The machining fluid supplying apparatus 18 includes a machining fluid receiving portion 18a connected to the machining fluid source (not shown), a pipe portion 18b and a machining fluid supplying nozzle 20 mounted to the distal end 18c of the pipe portion 18b through a suitable rotary joint member 18d (see FIG. 5). The nozzle 20 directs and supplies the machining fluid from its open end(s) to the machining area between the grinding wheel T and the workpiece W (see FIG. 4), that is, to the contact zone P between the grinding wheel T and the workpiece W.

The machining fluid supplying apparatus 18 of the machining center MC always supplies the machining fluid to the contact zone P through the machining fluid supplying nozzle 20 under the optimal supplying condition. While the workpiece W is machined, the contact zone P between the grinding wheel T and the workpiece W, however, continuously changes with the progress of the machining operation due to the wear of the grinding wheel T. A rotary mechanism (rotational moving means) and a linear movement mechanism (straight moving means) for moving the machining fluid supplying nozzle 20 through the cylindrical support 16 and to position and orient the machining fluid supplying nozzle 20 so as to correctly direct the nozzle open end to the contact zone P, will be described.

As described above, the cylindrical support 16 for supporting the machining fluid supplying apparatus 18 is mounted through rotary bearings 22a and 22b (see FIG. 6) comprising, for example, a known ball bearing to rotate over 360 degrees about the axis of the main spindle head 10 and the main spindle 12. Therefore, when the cylindrical support 16 rotates, the machining fluid supplying apparatus 18 also rotates over 360 degrees about both the main spindle head 10 and the main spindle 12.

At the front end of the cylindrical support 16, a straight guide portion 16a having a guide block 16b is defined. A straight movement rod 17 is slidably mounted into a straight guide channel 16c formed in the guide block 16b. The machining fluid supplying apparatus 18 is integrally connected to the straight movement rod 17 so that the machining fluid supplying apparatus 18 can also linearly move. The machining fluid supplying apparatus 18 is designed to move toward and away from the axis of the main spindle 12 in the radial direction. Thus, the open end of the machining fluid supplying nozzle 20 can move toward and away from the rotational axis of the grinding wheel T mounted to the main spindle 12 in the radial direction.

Figure 5:
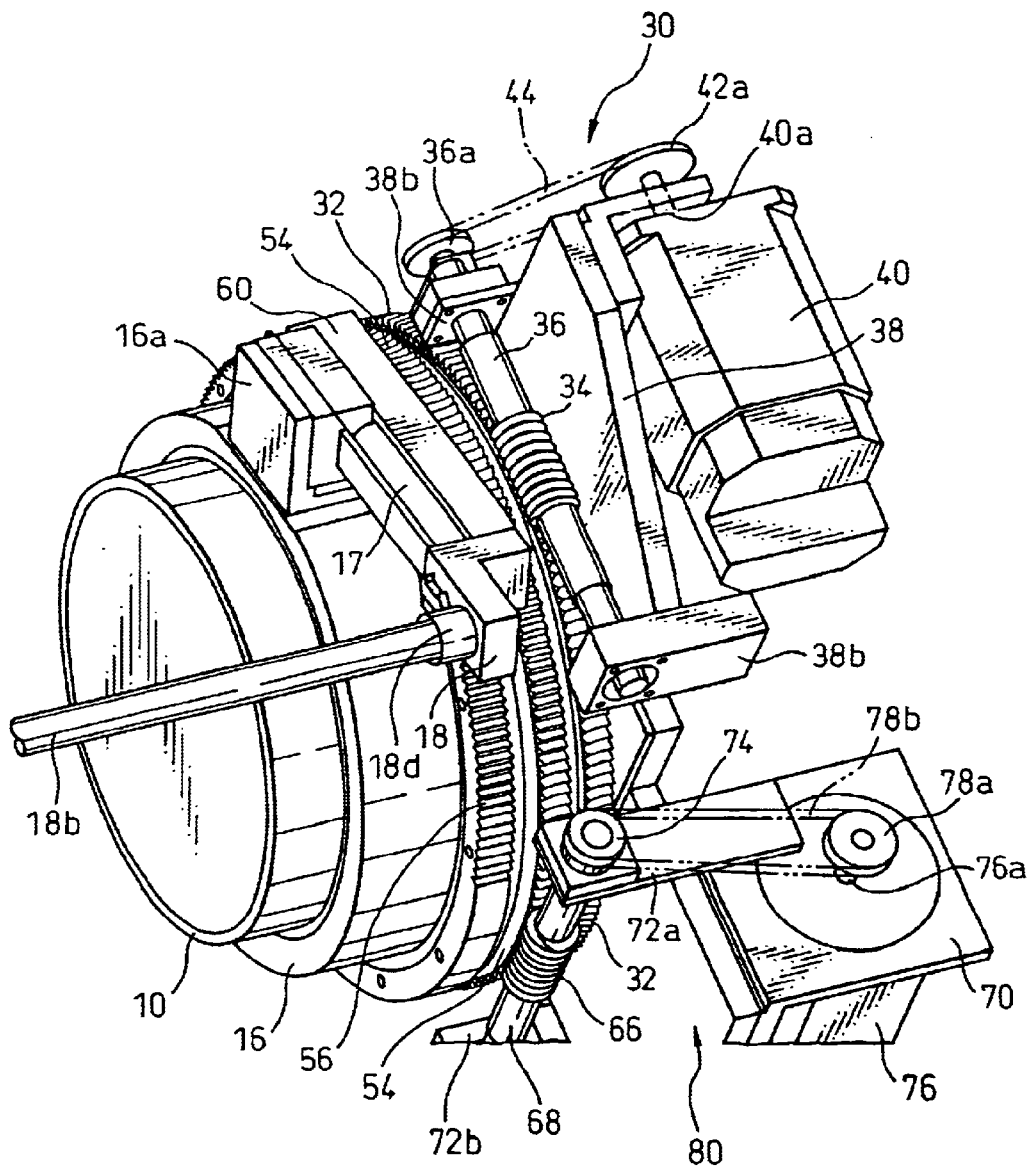
FIG. 5 is a perspective view showing principal portions of straight moving means and cylindrical supporting means for movably supporting machining fluid supplying means having a machining fluid supplying nozzle by rotating moving means in a circumferential direction and in a radial direction.

A rotary mechanism 30 includes a first worm wheel 32 which is mounted to the rear end portion of the cylindrical support 16 opposite to the front end portion where the straight guide portion 16a is provided. A first worm 34 engages the first worm wheel 32. When the first worm 34 is rotationally driven, a rotational force is applied to the first worm wheel 32. This configuration allows the cylindrical support 16 to rotate through 360 degrees about the axis of the main spindle 12 through the bearings 22a and 22b. With reference to FIG. 5, the first worm 34 is defined on the outer surface of a shaft 36 extending perpendicular to the axis of the main spindle 12. The shaft 36 is rotationally supported through suitable bearings provided in a pair of support members 38a and 38b. The support members 38a and 38b are connected to a bracket 38 which is mounted to the main spindle head 10.

A pulley 36a is mounted to one of the ends of the shaft 36. The bracket 38 also supports a driving motor 40 comprising a servomotor or the like. A pulley 42 is mounted to the distal end of the output shaft 40a of the driving motor 40. A timing belt 44 extends between the pulleys 42a and 36a to transmit the rotational driving force from the driving motor 40 to the first worm 34. Thus, in this particular embodiment, the rotary mechanism 30 for rotating and moving the machining fluid supplying nozzle 20 of the machining fluid supplying apparatus 18 includes the driving motor 40, the belt-pulley mechanism having the timing belt 44 and the pulleys 36a and 42a, the first worm 34 and the first worm wheel 32. Controlling the amount and the direction of the rotation of the output shaft 40a of the driving motor 40 controls the rotational position of the cylindrical support 16 around the full periphery of the axis of the spindle. In consequence, the cylindrical support 16 can be positioned and set to a desired circumferential position.

Figure 6:
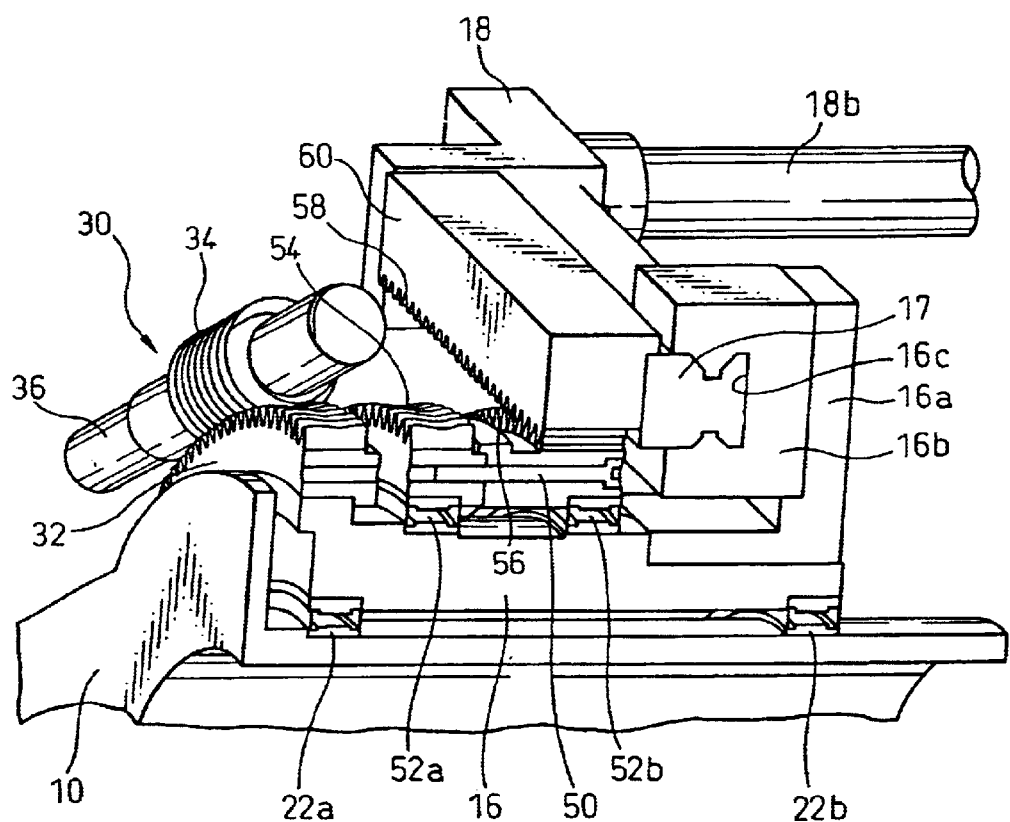
FIG. 6 is a perspective view showing principal portions of an engagement state between worm wheels and worms constituting straight moving means and rotational moving means for moving machining fluid supplying means in a circumferential direction and in a radial direction, and also an engagement state between a rack and a pinion in the machining center according to the present invention.

A cylindrical gear support 50 is supported on the outer surface of the cylindrical support 16 at an intermediate portion in the longitudinal direction through ball bearings 52a and 52b for rotation about the axis of the main spindle 12. A second worm wheel 54 is mounted on the outer surface of the gear support 50 parallel to the first worm wheel 32. The second worm wheel 54 can rotate integrally with the gear support 50. A spur gear wheel 56 is mounted to the gear support 50 adjacent the second worm wheel 54. A rack 60 includes rack teeth 58 which engage the gear teeth of the spur gear wheel 56, as shown in FIG. 6. The rack 60 is coupled with the straight movement rod 17 by suitable fastener means, and is therefore incorporated into the machining fluid supplying apparatus 18. When the gear support 50 rotates, the rack 60 moves linearly and longitudinally through the engagement between the spur gear wheel 56 and the rack 60. As a result, the machining fluid supplying apparatus 18 connected to the rack 60 linearly moves with the straight movement rod 17 so that the machining fluid supplying nozzle 20 moves linearly in the radial direction relative to the axis of the main spindle 12.

The second worm wheel 54 engages a second worm 66, as shown in FIG. 5. The second worm 66 is defined on the outer surface of a shaft 68. The shaft 68 is rotationally supported by a pair of support members 72a and 72b through bearings (not shown) provided in the support members. The support members 72a and 72b are connected to a bracket 70 which is mounted to the main spindle head 10. A pulley 74 is mounted to one of the ends of the shaft 68. A pulley 78a is mounted to the distal end of an output shaft 76a of a driving motor 76 comprising a servomotor held by the bracket 70. A timing belt 78 extends between the pulleys 78a and 74. The rotation of the driving motor 76 moves the machining fluid supplying nozzle 20 in the radial direction with respect to the axis of the main spindle 12 through a belt-pulley mechanism, comprising the timing belt 78b and the pulleys 74 and 78a, and a linear movement mechanism 80, comprising the second worm 66, the second worm wheel 54, the spur gear wheel 56 and the rack 60. In this connection, it should be noted that, when the machining fluid supply nozzle 20 is moved, the driving motor 40 must be stopped to prevent the rotation of the first worm wheel 32 so that the cylindrical support 16 is secured. Switching the rotational direction of the second worm wheel 54 and the super gear wheel 56 switches the radial movement of the machining fluid nozzle 20 between the directions toward and away from the axis.

To move the machining fluid supplying nozzle 20 toward and away from the axes of the main spindle 12, the length of the rack 60 and the size and number of the teeth of the rack 60 and the super gear wheel 56, etc, may be designed appropriately in accordance with the maximum and minimum linear moving distances that vary depending on the maximum value of the diameter of the grinding wheel T used. The super gear wheel 56 may have teeth provided over a portion of the periphery of the wheel.

In the rotary mechanism 30, for rotating and moving the machining fluid supplying nozzle 20 of the machining fluid supplying apparatus 18, and the linear movement mechanism 80, for linearly moving the nozzle 20, the driving motors 40 and 76 are mounted to the brackets 38 and 70 disposed around the main spindle head 10 which carries the cylindrical support 16 for rotation, and the cylindrical support 16 and the first and second worm wheels 42 and 54, mounted to the cylindrical support 16, are rotated by the relatively small first and second worm wheels 42 and 54. Therefore, there are no members and mechanical components which mechanically interfere with the rotation of the cylindrical support 16. In consequence, the machining fluid supplying apparatus 18 and the machining fluid supplying nozzle 20 can rotate over 360 degrees about the axis of the main spindle 12, and the open end of the machining fluid supplying nozzle 20 can be positioned and set to the optimum machining fluid supplying position relative to the contact zone P between the grinding wheel T and the workpiece w through the combination of the rotation and the linear movement in the radial direction.

Figure 7:
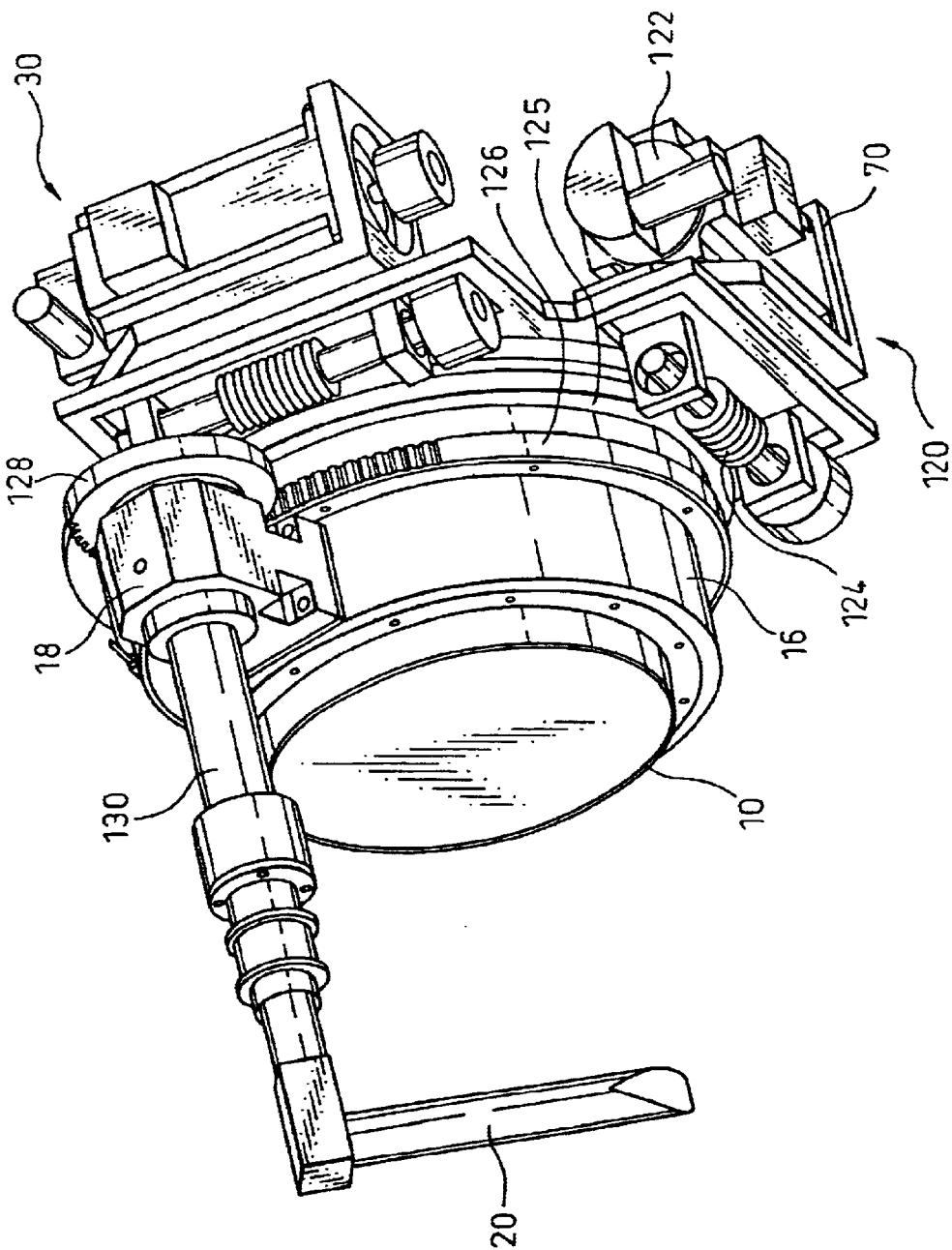
FIG. 7 is a perspective view showing principal portions of cylindrical supporting means for movably supporting machining fluid supplying means having a machining fluid supplying nozzle in a circumferential direction and in a radial direction by turning-moving means and rotational moving means in the machining center according to the present invention.

Next, another embodiment will be explained with reference to FIG. 7. In this connection, an explanation for the elements indicated by the same reference numerals as those in the embodiment shown in FIGS. 1 to 6 will be omitted.

The difference of this embodiment relative to the embodiment shown in FIGS. 1 to 6 is a provision of a turning mechanism 120 instead of the linear movement mechanism 80. The turning mechanism 120 includes a driving motor 122 which is supported by the bracket 70 disposed in the outside area in the periphery of the main spindle head 10 to which the cylindrical support 16 is rotationally mounted to rotate a third worm wheel 126, mounted to the cylindrical support 16, through a third worm 124. The belt-pulley mechanism transmits the driving force of the driving motor 122 to the third worm 124, similar to the linear movement mechanism 80. A gear wheel 126 is connected integrally to the third worm wheel 125. The gear wheel engages a pinion 128. A shaft portion 130, having the machining fluid supplying nozzle 20 at its tip, is connected integrally to the pinion 128. The shaft portion 130 is rotationally supported by a known bearing in the machining fluid supplying apparatus 18. When the driving motor 122 is activated, the shaft portion 130 having the machining fluid supplying nozzle 20 is rotated around its axis through the third worm 124, the third worm wheel 125, the gear wheel 126 and the pinion 128.

In this embodiment, the combination of two movements, the turning movement by the turning mechanism 120 and the rotational movement by the rotary mechanism 30, positions the machining fluid supplying nozzle 20 relative to the contact zone P between the grinding wheel T and the workpiece W. The difference between this embodiment and the foregoing embodiment is that, in this embodiment, the machining fluid supplying nozzle 20 is positioned by the turning mechanism 120 in the radial direction of the grinding wheel T. In other words, the synchronized movements of the rotary mechanism 30 and the turning mechanism 120 positions the machining fluid supplying nozzle 20 relative to the contact zone P between the grinding wheel T and the workpiece W.

Positioning of the machining fluid supplying nozzle 20 in the circumferential direction of the grinding wheel T by the rotary mechanism 30 and positioning of the machining fluid supplying nozzle 20 in the radial direction of the grinding wheel T by the turning mechanism 120 can also be conducted separately. The sequence of the operations is not particularly limited. Even though the turning mechanism 120 is disposed, the machining fluid supplying nozzle 20 can rotate over 360 degrees about the axis of the main spindle 12 without interference, similar to the foregoing embodiment.

Here, when a workpiece W is machined with the machining fluid supplied through the machining fluid supplying apparatus 18 which is provided in the machining center MC, the main spindle head 10 can, of course, move in the directions of two orthogonal axes with respect to the column 14. Further, providing a work table (not shown) on which the workpiece W is secured to move in a direction perpendicular to the orthogonal two axes (X and Y axes), that is, in the direction of the Z-axis, to machine the workpiece W on this work table, surface grinding of the workpiece can be conducted under the optimum supply condition of the machining fluid.

Figure 8:
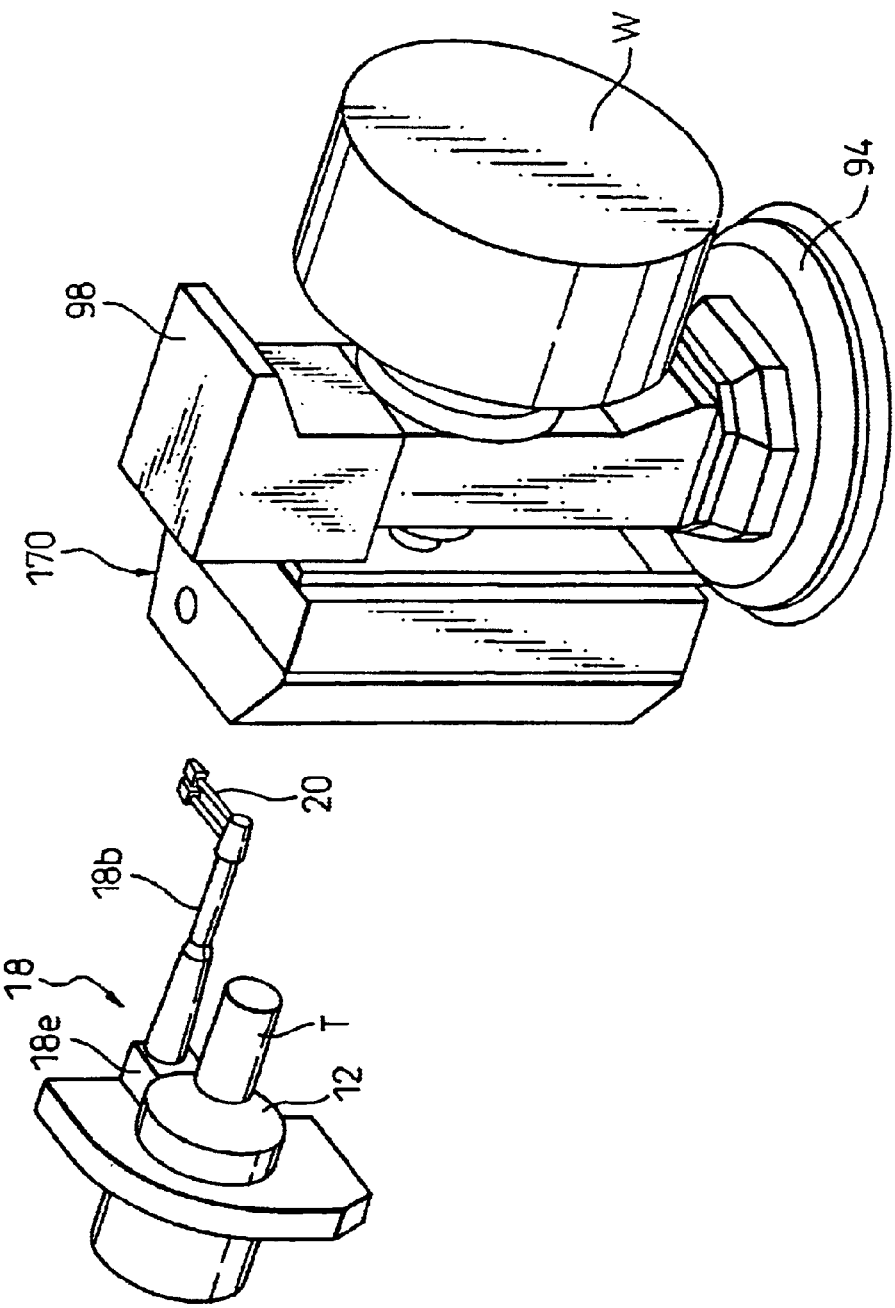
FIG. 8 is a schematic perspective view showing a nozzle exchanging method of a machining fluid supplying nozzle when a nozzle box is closed, in the machining center according to the present invention.
Figure 9:
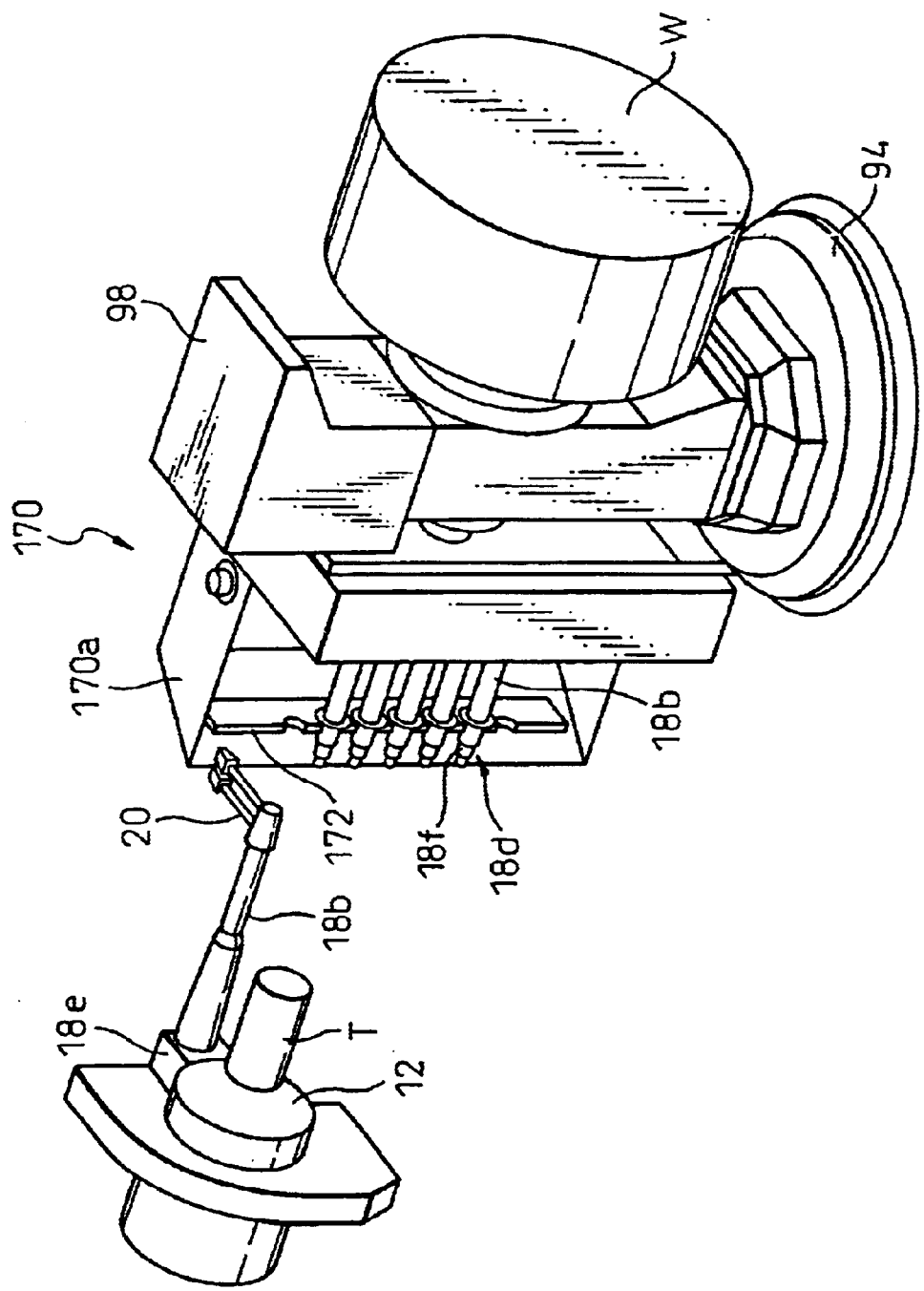
FIG. 9 is a schematic perspective view showing an exchanging method of a machining fluid supplying nozzle when a nozzle box is opened, in the machining center according to the present invention.

When grinding is conducted, an optimum machining fluid supplying nozzle 20 is selected or changed variously depending on the kind and the size of the grinding wheel T used and the shape and the material of the workpiece w to be machined. FIGS. 8 and 9 show an example of a process for automatically exchanging the machining fluid supplying nozzle 20. In the embodiment shown in FIGS. 8 and 9, a nozzle box 170 is mounted to the back of the above-described rotary head 98. The nozzle box 170 accommodates a plurality of kinds of machining fluid supplying nozzles 20 which are put in a vertical array and are removably mounted to a nozzle securing part 172. To automatically exchange the machining fluid supplying nozzle 20, the machining fluid supplying apparatus 18 has a connection portion 18e for removably connecting a pipe portion 18b. The proximal end portion of the pipe portion 18b defines an adaptor 18f which fits removably on the connection portion 18e.

When the machining fluid supplying nozzle 20 is changed, the rotary head 98 is first rotated 180 degrees from the state shown in FIG. 1 so as to face the main spindle 12 (see FIG. 8). Next, a cover 170a of the nozzle box 170 is opened. The used machining fluid supplying nozzle 20 is returned to an empty portion of the nozzle securing part 172 by utilizing the positioning function of the machining center MC. The connection portion 18e of the machining fluid supplying apparatus 18 is aligned with the pipe portion of a machining fluid supplying nozzle 20 to be used in the next process. Then the connection portion 18e approaches, in the Z-axis direction and to be fitted on the adaptor 18f of the pipe portion 18b. After the exchange of the machining fluid supplying nozzle 20 is completed in this way, the machining fluid supplying nozzle 20 is again moved to a predetermined position in the machining area. The rotary head 98 is rotated 180 degrees so that the workpiece W is positioned to face the main spindle 12.

Next, a process of automatically changing tools of the machining center MC will be explained, with reference to FIG. 10.

A tool storage apparatus 290 holds a plurality of grinding wheels T and dresser tools DT for use in the machining center MC. Within the tool storage apparatus 290, the grinding wheels T and the dresser tools DT are fitted to tool pots 294 and are removably mounted to predetermined positions of tool mounting portions 292. In this embodiment, the tool storage apparatus 290 is particularly arranged so that the grinding wheels T are oriented perpendicularly to the Z-axis of the machining center MC. When the tools are changed, a slider 296 of the tool storage apparatus 290 selects grinding wheel T and dresser tool DT which are to be used in the next process, and grips the tool pot 294 while the tools are fitted to the tool pot 294. The tools are transported to a delivery position between the tool storage apparatus 294 and a tool conveyor 180.

The tool conveyor 180 includes a tool holding plate 182 that can rotate 90 degrees about a vertical axis $O_1$ and 180 degrees about a horizontal axis $O_2$. The tool holding plate 182 defines a pair of tool pot holding portions 184 at the both ends so that both a grinding wheel T and a dresser tool DT are transported to an automatic tool changer 190 by a single transfer operation.

The automatic tool changer 190 includes a tool exchanging arm 192 which rotates over 180 degrees about an axis $O_3$ parallel to the Z-axis of the machining center MC, and advances and retracts along the axis $O_3$. The tool exchanging arm 192 is provided at the both ends with tool holder holding portions 194 for holding a tool holder of the grinding wheel T so that the tool holding portions hold a used grinding wheel T or dresser tool DT with a new grinding wheel T or dresser tool DT to be used in the next process to change them together.

Next, with reference to FIGS. 10 to 12, a process for automatically changing tools will be explained in sequence.

First, the tool conveyor 180 conveys a used grinding wheel T and the used dresser tool DT from the machining center MC to the tool storage apparatus 90. At this time, the tool conveyor 180 is at a position where its center axis $O_2$ is perpendicular to the Z-axis. Next, the slider 296 of the tool storage apparatus 290 grips the tool pot 294 of the grinding wheel T or the dresser tool DT, held by the tool conveyor 180, which pot is disposed at the tool delivery position. The slider 296 transports the grinding wheel T or dresser tool DT to mount its tool pot 294 to the tool mounting portion 292. The slider 296 then transports a new grinding wheel T or dresser tool DT to be used in the next process to the tool delivery position, and fits it to the tool pot holding portion 184 of the tool conveyor 180.

The tool holding plate 182 of the tool conveyor 180 rotates 180 degrees about the center axis $O_2$ so that the dresser tool DT or the grinding wheel T held by the opposite tool pot holding portion 184 is disposed at a tool delivery position. Then, the slider 296 similarly mounts the dresser tool DT or the grinding wheel T to the predetermined tool mounting portion, selects the dresser tool DT or the grinding wheel T to be used in the next process, and fits it to the empty tool pot holding portion 184.

Figure 11A:
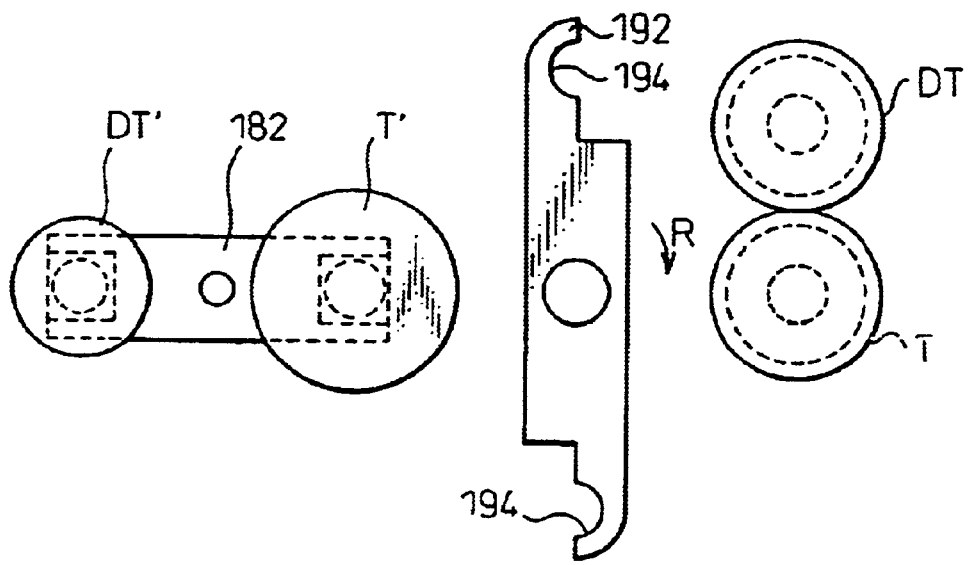
FIG. 11A is a schematic front view for explaining an exchanging method of a grinding wheel and a dresser of the machining center according to the present invention, showing a state of preparation for changing the grinding wheel.
Figure 11B:
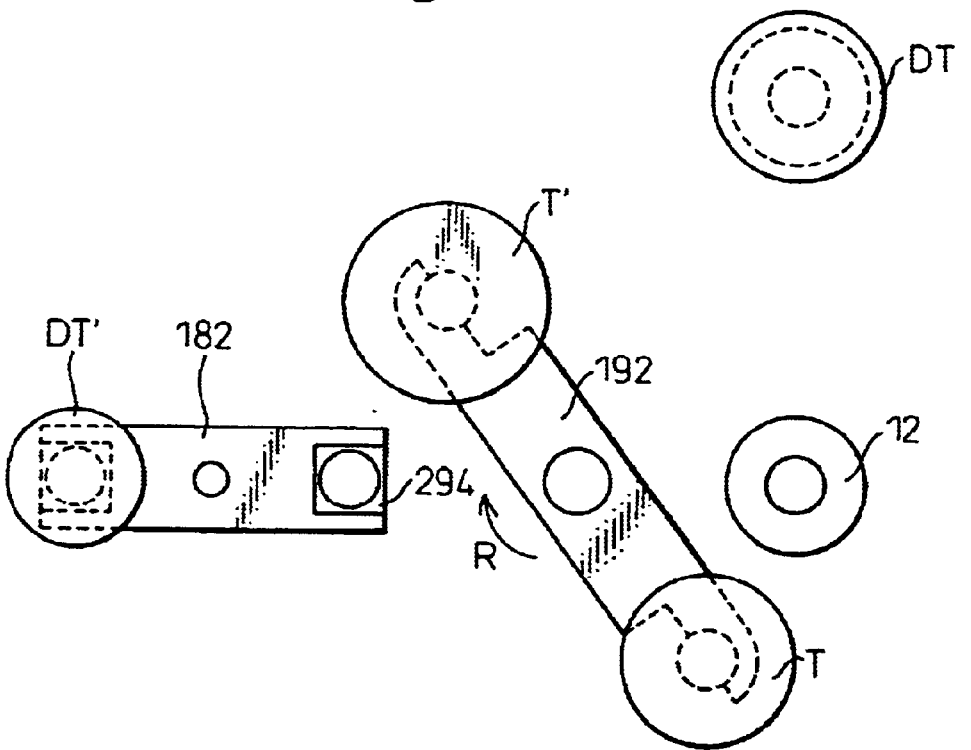
FIG. 11B is a schematic front view resemble to FIG. 11A, showing a state of changing the grinding wheel.

Next, the tool conveyor 180 rotates 90 degrees about the vertical axis $O_1$ to transport the new tool to the automatic tool changer 190. At this time, the tool conveyor 180 is disposed at a position where its center axis $O_2$ is parallel to the Z-axis, as schematically shown in FIG. 11(a). When the exchange of the tool is thus ready, the automatic tool changer 190 waits for the tool exchange command from the machine controller 102.

When the machine controller 102 generates the tool exchange command, the dresser spindle head 150 moves up, and the dresser tool DT moves away from the grinding wheel T. Next, the tool exchanging arm 192 rotates in the direction indicated by an arrow R (clockwise direction in FIGS. 11 and 12) about the center axis $O_3$, and simultaneously holds the used tool T and the new tool T' with the tool holder holding portions 194 at its both ends. Next, the tool exchanging arm 192 advances along the center axis $O_3$ to pull out the used tool T and the new tool T' from the tool fitting portion 12a of the main spindle 12 and the tool pot 294, respectively. From this state, the tool exchanging arm 192 further rotates (FIG. 11(b)) to align the new tool T' and the used tool T with the center axis (Z-axis) of the main spindle 12 and the center axis of the tool pot 294 held by the tool holding plate 182 of the tool conveyor 180. The tool exchanging arm 192 thereafter retracts along the center axis $O_3$ to fit the new tool T' and the used tool T into the tool fitting portion 12a of the main spindle 12 and the tool pot 294, respectively.

Figure 12A:
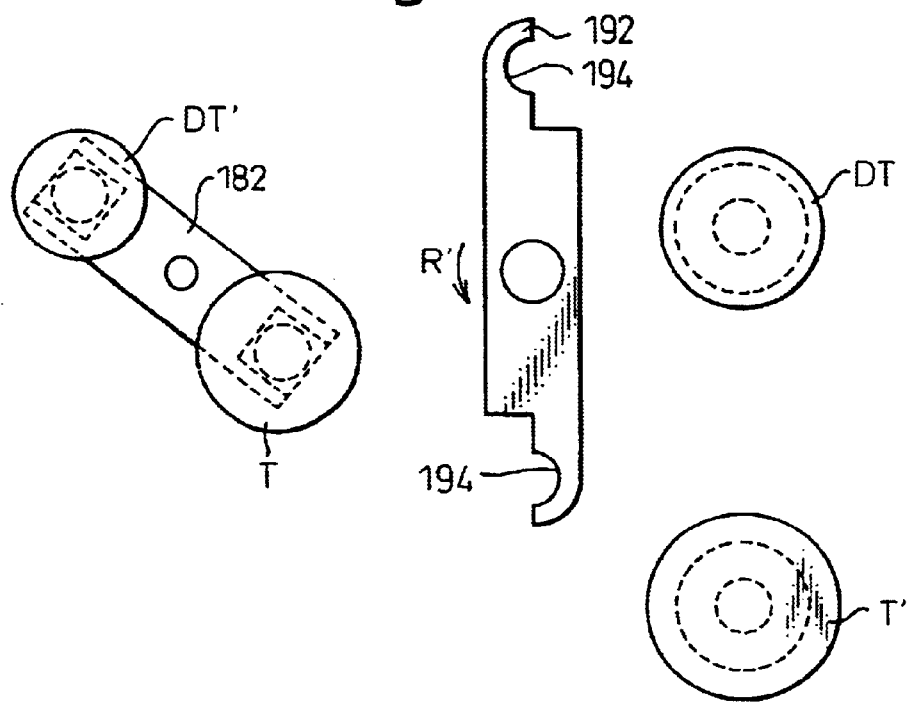
FIG. 12A is a schematic front view resemble to FIG. 11A, showing a state of preparation for changing the dresser.
Figure 12B:
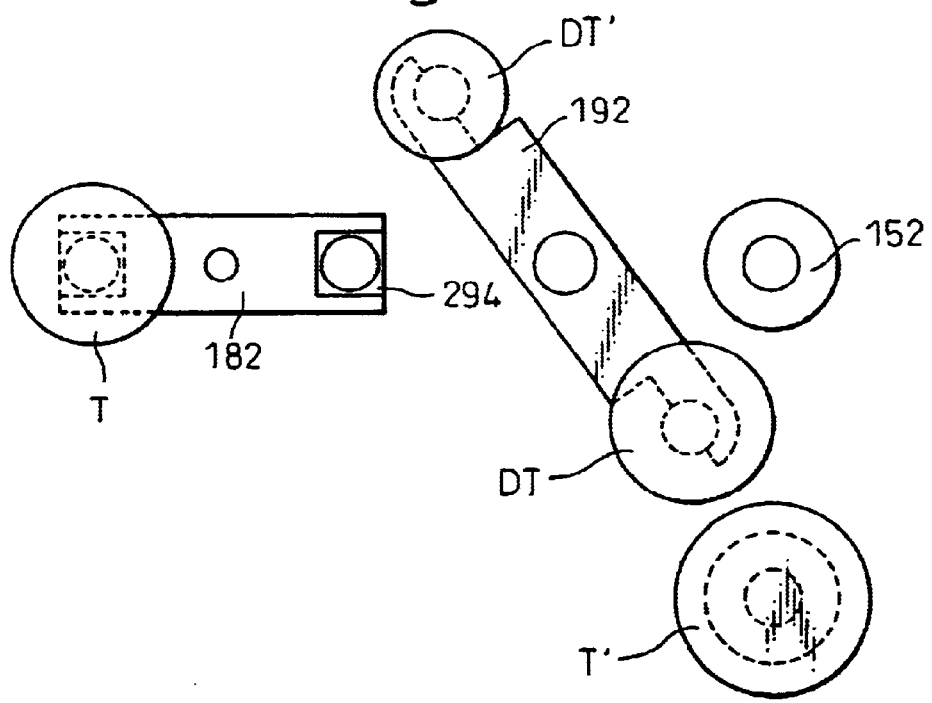
FIG. 12B is a schematic front view resemble to FIG. 11A, showing a state of changing the dresser.

Next, the tool exchanging arm 192 rotates in a counter-clockwise direction R', in FIGS. 11 and 12, about the center axis $O_3$ to disengage from the new tool T', and the used tool T mounted to the main spindle 12 and the tool pot 294, respectively, where the tool exchanging arm 192 is at a vertical stand-by position, as shown in FIG. 12(a). The main spindle head 10 then is lowered together with the dresser spindle head 150. The tool holding plate 182 of the tool conveyor 180 rotates in the clockwise direction to change the positions of the used tool T and the new dresser tool DT' with each other (see FIG. 12(a)). When the position exchange is complete between the used tool T and the new dresser tool DT', the tool exchanging arm 192 rotates about the center axis $O_3$ to change the used dresser tool DT with the new dresser tool DT', as described above.

Referring next to FIG. 13, the machining center MC includes a workpiece measuring apparatus MR which contacts to determine the outer dimensions and shape of the grinding wheel Ts stored in the tool storage apparatus 290 and workpiece W described below. The workpiece measuring apparatus MR is removably mounted to the main spindle 12 provided in the main spindle head 10 by using tool changing means (not shown) such as known tool exchanging arms. FIG. 1 shows a grinding wheel T, as an example of the tool T, indicated by solid line in the upper half, which is transported from the tool storage apparatus 290 and mounted to the main spindle 12, and the workpiece measuring apparatus MR, indicated by dotted line in the lower half, which is mounted to the main spindle 12.

An automatic tool measuring apparatus 110 is mounted to the table 94 at a predetermined position. In other words, the automatic tool measuring apparatus 110 is disposed at a predetermined reference position in the X-, Y- and Z-axial directions on the table 94, and the position data (coordinates value in the X-, Y- and Z-axial directions) are previously recognized as reference position data. In the example shown in FIG. 13, the automatic tool measuring apparatus 110 is provided to retract into the table 94 to avoid damage. A cover 112 closes after the retraction of the automatic measuring apparatus 110. The automatic tool measuring apparatus 110 defines, at the distal end, a measurement tip 110a comprising a contactor, or the like, made of a rigid material. When the measurement tip 110a of the automatic tool measuring apparatus 110 comes into contact with the grinding wheel T mounted to the main spindle 12 during the movement of the main spindle head 10 and the column 14 in the X- and Y-axial directions and the movement of the table 94 in the Z-axis direction, it determines the outer diameter of the grinding wheel T. In other words, since the reference position data of the measurement tip 110a of the automatic measuring apparatus 110 relative to the base 92 is stored as known data in the machine controller 102, the actual measurement value of the outer diameter of the grinding wheel T can be determined by a calculation based on the position data in the X-, Y- and Z-axial directions which are input to the machine controller 102, when the grinding wheel T contacts the measurement tip 110a, from a position detector provided on the machine side at the time.

In case that the workpiece measuring apparatus MR is mounted to the main spindle 12, the center position of the main spindle 12 is previously stored as known data in the machine controller 102. By feeding the main spindle 12 and the table 94 relative to each other in the three-axial directions (X-, Y- and Z-axial directions), the outer dimension of the workpiece W can be determined through a simple add-subtract calculation executed in the machine controller 102, based on the measured value of the fed distances, when the measuring tip of workpiece measuring apparatus MR contacts the outer peripheral surface of a work W mounted to workpiece holder 100, and the known data of the position of the main spindle 12. The automatic tool measuring apparatus 110 may, of course, be a non-contact type measuring apparatus that conducts measurement without contacting a workpiece W.

In the machining center according to this embodiment, the machining fluid supplying apparatus 18 and the tool dressing apparatus D for truing or dressing are always disposed around the spindle head having the main spindle 12. The machining fluid supplying apparatus 18 has the machining fluid supplying nozzle 20 with the open end, and is connected to a machining fluid source such as the machining fluid tank through a conduit, as in the foregoing embodiment, although they are not shown in FIG. 13. While the grinding wheel T grinds a workpiece W, the machining fluid is directed toward the contact area P, where the grinding wheel T meets the workpiece W, through the open end of the machining fluid supplying nozzle 20 to quickly wash away chips generated from the machining area and to cool both the grinding wheel T and the workpiece W. Therefore, smooth progress of the machining is insured.

Figure 14:
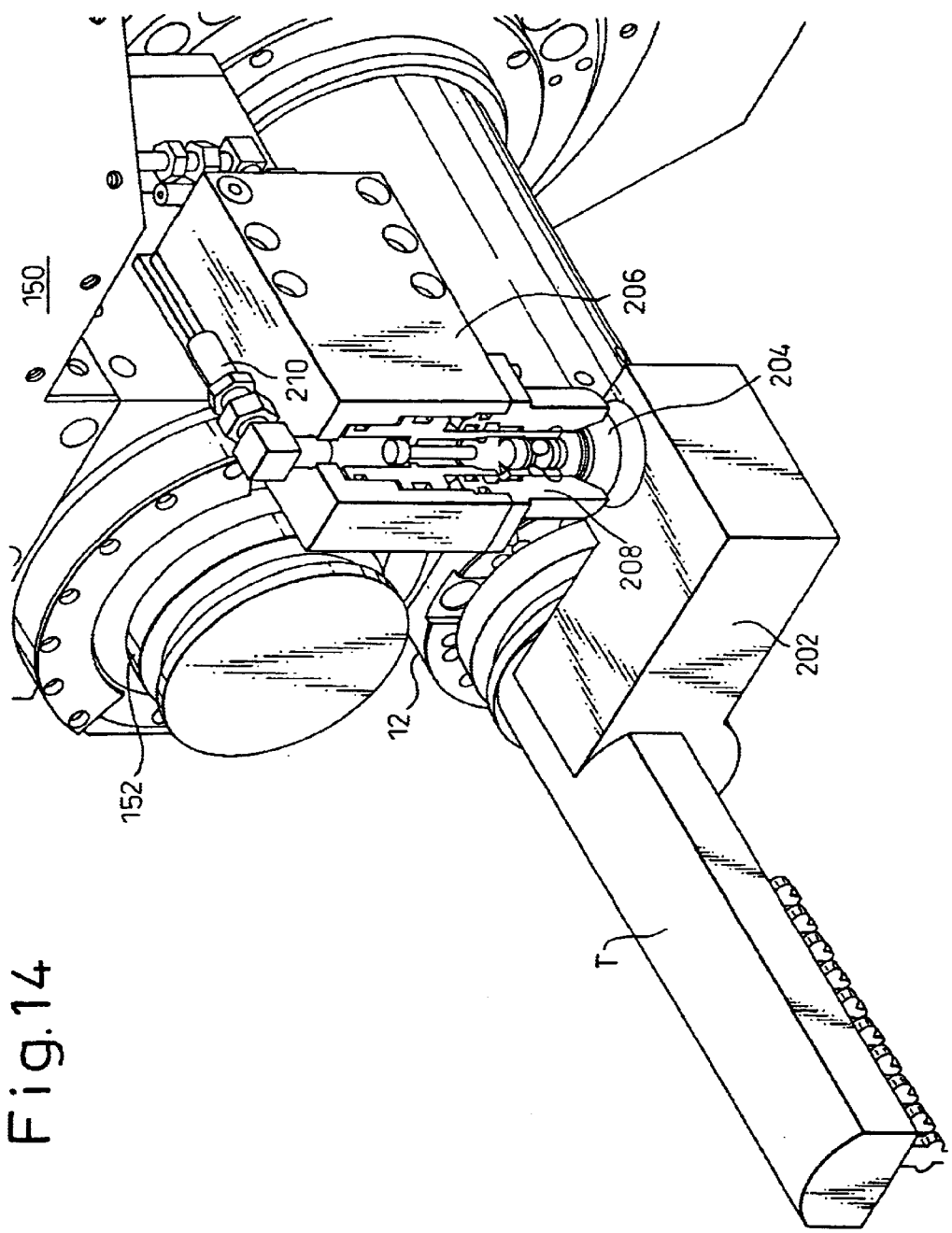
FIG. 14 is a perspective view of principal portions when a broaching tool is mounted to a spindle of the machining center according to the present invention.

In the embodiment shown in FIG. 14, a cutting tool, particularly a broaching tool, is mounted as the tool T to the main spindle 12 of the machining center MC. In general, when a cutting tool is mounted to a spindle, the tool is held so as not to rotate in the rotational direction of the spindle by the static torque of the spindle motor. It is difficult to correctly detect the position of the cutting tool if the static torque of the spindle motor is sufficiently high. Therefore, a cutting operation cannot be carried out with a high accuracy. In this embodiment, the cutting tool T is equipped at its proximal end with a tool bracket 202. A pull stud 204 is mounted to the upper surface of the tool bracket 202. A hydraulic ball collet 208 is mounted to a side surface of the dresser spindle 150 through a bracket 206. In this connection, a hydraulic conduit is disposed at the rear end (upper end) of the ball collet 204 to supply the hydraulic pressure to the ball collet 208. In this embodiment, the dresser spindle head 150 is lowered after the cutting tool T is mounted to the main spindle 12 and the ball collet 208 engages the pull stud 204. Clamping the pull stud 204 can prevent the rotation of the cutting tool T without using the spindle motor.

It will also be understood by those skilled in the art that the forgoing description is a preferred embodiment of the invention and that various changes and modifications may be made without departing from the spirit and scope of the invention.

We claim:
1. A machining center for machining a workpiece by moving a grinding wheel and the workpiece relative to each other in X-, Y- and Z-axial directions, comprising:

a main spindle for removably mounting a grinding wheel;

a spindle head for rotationally supporting the main spindle;

a table for mounting the workpiece;

a column for movably supporting the spindle head; and tool dressing means having a dresser spindle, provided over the spindle head to move in the vertical direction toward and apart from the grinding wheel mounted to the main spindle, for mounting a dresser for dressing the outer peripheral surface of the grinding wheel; and machining fluid supplying means including a machining fluid nozzle for directing a machining fluid to a dressing area where the grinding wheel and the dresser engage with each other, the machining fluid nozzle being provided for advancing and retreating in an axial direction of the dresser spindle of the tool dressing means.

2. A machining center according to claim 1, further comprising tool measuring means, disposed at a portion of a structure of the machining center, for measuring a wheel diameter or the position of the tool edge of the grinding wheel mounted to the main spindle.

3. A machining center according to claim 1, wherein the tool dressing means comprises:

a base mounted to the spindle head;

a slider movable in the vertical direction relative to the base;

a vertical movement motor, mounted to the base, for driving the slider;

a dresser spindle for removably mounting the dresser;

a dresser spindle head, mounted to the slider, for rotationally supporting the dresser spindle; and a driving motor, provided to the slider, for rotating the dresser spindle through rotation transmitting means.

4. A machining center according to claim 1, further comprising:

cylindrical supporting means, disposed around the main spindle, for movably supporting the machining fluid nozzle of the machining fluid supplying means;

radially moving means for moving the machining fluid nozzle of the machining fluid supplying means which is supported by the cylindrical supporting means to position the machining fluid nozzle in a radial direction relative to the grinding wheel; and circumferentially moving means for rotating the cylindrical supporting means to position the machining fluid nozzle of the machining fluid supplying means at any angular position around the grinding wheel.

5. A machining center according to claim 4, wherein the radially moving means comprises:

a rack gear provided to the machining fluid nozzle of the machining fluid supplying means;

a gear wheel, movable relative to the cylindrical supporting means, for engaging the rack gear;

a worm wheel movable with the gear wheel relative to the cylindrical supporting means;

a worm engaging the worm wheel; and a motor, mounted to the column, for rotating and driving the worm.

6. A machining center according to claim 4, wherein the circumferentially moving means comprises:

a worm wheel connected integrally with the cylindrical supporting means;

a worm engaging the worm wheel; and a motor, mounted to the column, for driving the worm.

* * * * *